No. 665,271. Patented Jan. 1, 1901.
T. G. SAXTON.
PISTON PACKING.
(Application filed Feb. 26, 1900.)
(No Model.) 2 Sheets—Sheet 2.

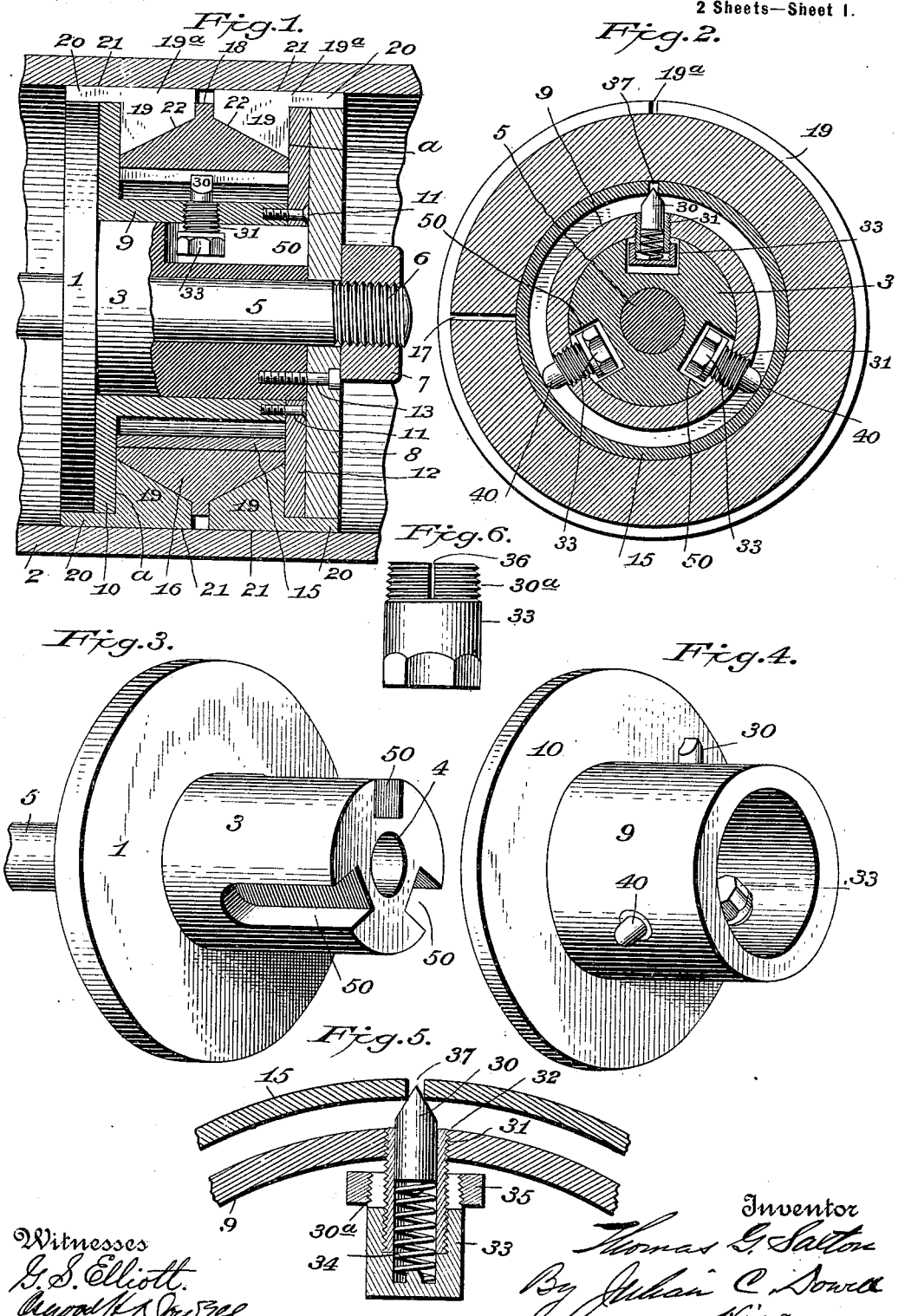

Witnesses
G. S. Elliott.
Inventor
Thomas G. Saxton
By John O. Dowell
His Attorney

UNITED STATES PATENT OFFICE.

THOMAS GUNNI SAXTON, OF LEXINGTON, KENTUCKY, ASSIGNOR TO
J. ROGERS BARR, OF SAME PLACE.

PISTON-PACKING.

SPECIFICATION forming part of Letters Patent No. 665,271, dated January 1, 1901.

Application filed February 26, 1900. Serial No. 6,626. (No model.)

*To all whom it may concern:*

Be it known that I, THOMAS GUNNI SAXTON, a citizen of the United States, residing at Lexington, in the county of Fayette and State of Kentucky, have invented certain new and useful Improvements in Piston-Packing; and I do hereby declare the following to be a full, clear, and exact description of the invention, such as will enable others skilled in the art to which it appertains to make and use the same.

This invention relates to pistons; and it consists, substantially, in such features of improvement as will hereinafter be more particularly described.

The invention has reference more particularly to that class or type of piston with which is combined a metallic packing for maintaining the piston fluid-tight within the working cylinder of a steam or other motive-power engine. Many forms of pistons of this type have been heretofore devised; but in a large number of instances the same have not fully met the requirements, in that leakage very soon takes place, due to imperfect expansion of the packing ring or rings or else to the unevenness of wear either of the piston or of the said packing. Moreover, in some cases heretofore considerable difficulty has been experienced in fitting the piston and its packing within the cylinder, as well as in removing the same from the cylinder for the purposes of adjustment or repair.

The object of the present invention is to overcome the inconveniences and difficulties pointed out and to provide a combined piston and metallic packing therefor which are capable of easy and uniform adjustment and which coöperate in such manner as to prevent leakage of the motive-power fluid, as well as securing even wear between the piston and its packing and between the latter and the cylinder.

The above and additional objects are attained by means substantially such as are illustrated in the accompanying drawings, wherein—

Figure 9:
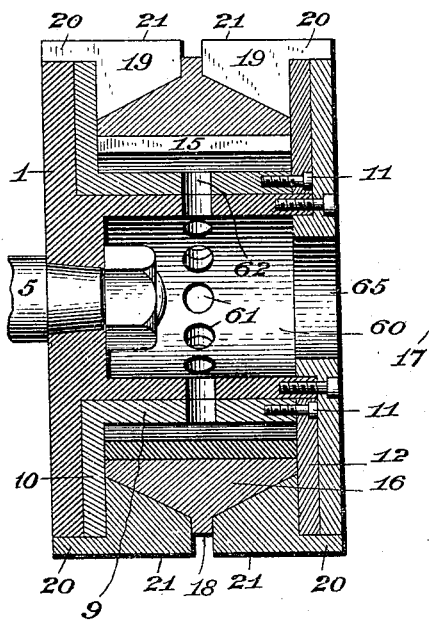
Figure 10:
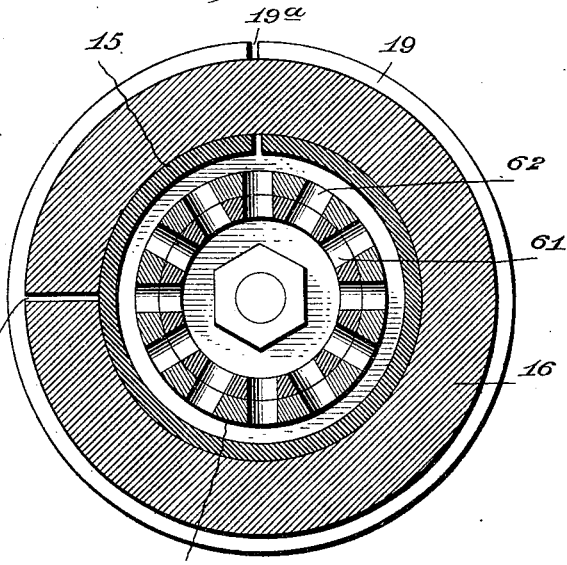
Figure 7:
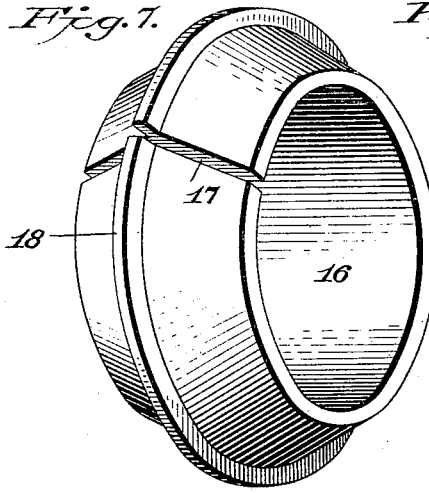
Figure 8:
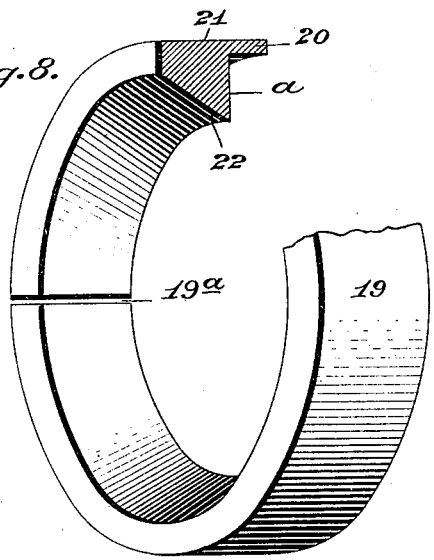

Figure 1 is a longitudinal sectional view of a combined piston and metallic packing therefor constructed and arranged in accordance with my invention, and Fig. 2 is a transverse sectional view illustrating further features of the invention sometimes adopted. Fig. 3 is an enlarged view in perspective of one of the main parts or elements of my improved structure, and Fig. 4 is a similar view of another part coöperating therewith. Figs. 5 and 6 are enlarged views in detail of certain parts more fully understood hereinafter. Figs. 7 and 8 are enlarged views in detail representing the construction or form of packing-rings employed. Figs. 9 and 10 are similar views to Figs. 1 and 2 and representing a modification of the construction shown by said latter figures.

In carrying my invention into effect I construct the piston in part of a disk or plate 1 of suitable thickness, the same having a diameter somewhat less than the inner diameter of the cylinder 2, in which the piston works. Projecting from said disk on one side is a centrally-disposed hub 3, the same being provided with a central longitudinal opening 4 for the passage of the piston-rod 5, which opening registers with a similar opening (not shown) in the disk, also for the passage of the said rod 5. As shown in Fig. 1, the end of the piston-rod projects beyond the end of the hub, and the same is screw-threaded at 6 for the reception of the nut 7, which screws onto the end of the rod and is tightened up against a follower plate or disk 8, which latter is slipped upon the rod and abuts the end of the hub 3 and in all respects corresponds to the disk 1 above referred to. The diameters of the disks 1 and 8 being greater than that of the hub 3, a circumferential recess of considerable depth is thus formed between the said disks and hub, and in order to complete my improved structure or device I employ a suitable metallic packing of peculiar construction, one which is thoroughly effective in preserving the piston steam or fluid tight within the cylinder, besides rendering the wear of the parts considerably less and uniform. Thus, as shown in Fig. 1, the numeral 9 designates a shell which incloses and closely fits the hub 3, the said shell being formed at one end with a flange 10, abutting the inner surface of disk or plate 1, and the said flange being of a depth equaling the diameter of the said disk, so as to be even or flush therewith at the circumference. The length of the said shell is a little less than the length of the said hub, and secured to the other end of the shell by means of suitable screws 11 is a follower-plate 12, which fits upon the hub and closely abuts the inner surface of the outer or main follower-plate 8 of the piston. In addition to being held in place by means of the nut 7, the said main follower-plate 8 is further secured by means of screws 13 passing through the same and entering the end of the hub, as shown. These screws, however, can in some instances be dispensed with; but I prefer to use the same as a means of security. The edge or circumference of the said plate 12 is flush or even with the edge of the said plate 8, and from the construction shown and described the strength and compactness of the structure are apparent.

Surrounding the shell 9 and fitting closely between the flange 10 and follower-plate 12 is a longitudinally-split ring 15, (see Fig. 2,) while inclosing and closely fitting the said ring 15 is a double conoidal split ring 16, (shown enlarged in Fig. 7,) the longitudinal split therein being designated at 17. The said double conoidal ring 16 is provided with a centrally-disposed circumferential flange 18 for a purpose to be described, and, similarly as with the ring 15, the same is snugly confined between the said flange 10 and follower-plate 12. Fitting around said ring 16 and held apart by means of the flange 18 thereon are two outer or band rings 19, each being split at 19$^a$ and formed with an extension 20, overlapping the edge or circumference of the disk 1 and flange 10 and follower-plates 8 and 12, respectively. The outer surface 21 of said rings as thus constructed furnishes increased bearing-surface for said rings, and by means of the overlapping portions or extensions 20 the piston proper is prevented from coming into contact with the cylinder. Hence no part of said piston proper is subjected to wear, and the same does not require to be renewed, as is the case in many former constructions. The inner surfaces of the rings 19 are beveled at 22 to correspond with the double conoidal surface of the ring 16, and in virtue of this construction it is evident that when the said rings 15 and 16 are expanded within the cylinder the double inclined faces of the latter ring will move against the said beveled inner surfaces of the rings 19 in such manner as to force the surfaces 21 of said rings 19 into close contact with the cylinder, and at the same time the abutting faces $a$ $a$ of the rings 19 will be forced into closer contact with the inner surfaces of the flange 10 and follower-plate 12, respectively. In this way any wear that takes place at the said abutting faces $a$ $a$ is compensated for and largely overcome, since any pressure exerted by the double conoidal ring on the inner beveled surfaces of the rings 19 is equally distributed both on said abutting faces and the outer or bearing surface 21.

Any suitable means may be employed for automatically expanding the several above-named metal packing-rings, so as to keep the piston fluid-tight within the cylinder, as well as to compensate for any wear that naturally takes place either between the rings and cylinder or between the rings themselves. Preferably, however, I employ a spring-actuated wedge-shaped plug 30, (see Fig. 5,) the same working in a screw-threaded nipple 31, fitting at one end in a threaded opening 32 in the shell 9. Screwing upon the inwardly-projecting end of said nipple is an elongated neck 33, which also serves as a box for holding the spring 34, which acts upon the said plug 30, and the upper end of said box-nut is exteriorly threaded and tapered at 30$^a$ to receive a jam-nut 35. As shown at Fig. 6, the tapered portion of the said elongated or box nut 33 is also split longitudinally at 36, and it is evident that by screwing the jam-nut 35 tightly into place the different adjustments of the plug 30 can be maintained after once having been effected through the medium of said nut 33. The tapered or wedge-shaped end of the plug 30 enters the split 37 in the ring 15, and it is evident how the parts operate without further specific mention on this point.

Inasmuch as the tendency of the rings to expand becomes less as the distance from the splits therein increases circumferentially, there is a tendency to bind more on one side than the other and the piston proper at times gets out of center with the cylinder. To overcome this and to properly center the piston proper at all times, I employ suitable devices in the form of blunt spring-actuated plugs 40, Fig. 2, which bear upon the inner surface of ring 15 in such manner as to impart to such ring a tendency to expand equally at all points, the said plugs 40 being so arranged radially to the piston and relatively to the expanding-plug 30 as to effect this result. Of course the same effect is produced on the outer rings, with the effect already described. These said plugs 40 are constructed, secured in place, and actuated substantially in the same manner as the plug 30, excepting that the end of the latter is tapered or wedge-shaped. Hence no further specific description of said plugs 40 is thought to be necessary herein. From the construction and arrangement described with reference to said plug 30 and the plugs 40, together with their adjusting devices, it is evident that unless special provision was made therefor the hub 3 could not enter the shell as hereinbefore set out. Therefore at points of said hub corresponding to the positions of said plug devices I form longitudinal slots or grooves 50 of proper length and depth to snugly receive said devices when the said hub 3 and shell 9 are properly fitted together.

At Figs. 9 and 10 I have shown a modification of my invention, the several parts being identically the same in all respects as before, with the exception of a slight alteration in the hub and the shell fitting upon the same. Thus in these figures (9 and 10) the said hub 60 is hollow and closed at one end by the disk 1, and arranged about the same circumferentially are a series of ports 61 for the passage of steam or other motive fluid. Said ports register and communicate with similar ports 62, formed in the circumference of the shell 9, and thus it will be seen that the expansion of the several rings is effected by the expansive power of the fluid itself, which enters the open end of the piston and passes through said ports in an obvious manner. In this form of my improved piston the piston-rod 5 is secured directly to the disk 1, while an opposite opening 65 is provided for the entrance of the fluid to the said ports.

While I have herein shown and described certain preferred details of construction and arrangement of parts, it is to be understood that I do not limit myself strictly thereto in practice.

Having thus fully described my invention, what I claim as new, and desire to secure by Letters Patent of the United States, is—

1. A piston having a circumferential recess, and comprising a straight split ring located in said recess, a double conoidal split ring inclosing said ring and formed with a centrally-disposed circumferential flange, outer split rings fitting the conoidal surfaces of said second-named ring on opposite sides of said flange, and means for automatically expanding said rings, substantially as described.

2. A piston having a circumferential recess, and comprising a straight split ring located in said recess, a double conoidal split ring inclosing said ring, outer split rings constructed to fit the conoidal portions of said second-named ring, each of said outer rings being extended to overlap the end disks of the piston at the circumference, and means for automatically expanding said rings, substantially as shown and described.

3. A piston having a circumferential recess, and comprising a straight split ring located in said recess, a double conoidal split ring inclosing said ring, outer split rings constructed to fit the conoidal portions of said second-named ring, and means for expanding said rings, the same comprising a spring-actuated wedge or bolt entering the split of the inner ring, substantially as described.

4. A piston comprising end disks or plates, a concentric hub, a shell surrounding the hub and having end flanges abutting said end disks or plates, an inner split ring located between said flanges, a double conoidal split ring inclosing said inner ring, outer rings extending beyond the circumference both of said disks and flanges, and means for expanding the rings, substantially as described.

5. A piston comprising a centrally-disposed hub having longitudinal grooves therein, a shell fitting upon said hub, expansible metallic packing-rings inclosing the shell, and an expanding device for said rings, the same comprising a spring-actuated bolt or wedge supported by the shell and entering a groove in the hub, substantially as shown and in the manner described.

6. A piston comprising a hub having a series of recesses therein extending longitudinally thereof and provided with end disks or plates, one of which is removable, a shell fitting over said hub having apertures therein coincident with said recesses, outwardly-spring-pressed plugs or plungers working in sleeves which extend from the shell into the recesses of the hub, for expanding the packing-rings which surround the shell, together with suitable packing-rings surrounding the shell in such manner as to be expanded outwardly by said outwardly-spring-pressed plugs or plungers, substantially as described.

7. In a piston, the combination with an expansible split ring, of one or more split metallic packing-rings surrounding said expansible ring, and a spring-actuated bolt or wedge engaging the divided ends of said expansible ring for expanding the latter and thereby expanding the said packing-rings, and radially-disposed spring-pressed bolts bearing outwardly upon the inner surface of said expansible ring, substantially as described.

In testimony whereof I affix my signature in presence of two witnesses.

THOMAS GUNNI SAXTON.

Witnesses:
W. O. BULLOCK, Jr.,
T. D. MURRAY.